United States Patent [19]

Bazes

[11] Patent Number: 5,103,466
[45] Date of Patent: Apr. 7, 1992

[54] CMOS DIGITAL CLOCK AND DATA RECOVERY CIRCUIT

[75] Inventor: Mel Bazes, Haifa, Israel

[73] Assignee: Intel Corporation, Santa Clara, Calif.

[21] Appl. No.: 499,185

[22] Filed: Mar. 26, 1990

[51] Int. Cl.⁵ .................. H04L 07/02; H04L 27/06
[52] U.S. Cl. ............................. 375/110; 375/95; 328/139
[58] Field of Search ............ 375/95, 110, 106, 87; 328/63, 139

[56] References Cited

U.S. PATENT DOCUMENTS 4,363,002 12/1982 Fuller .................................... 375/87
4,513,427  4/1985 Borriello et al. ...................... 375/110

Primary Examiner—Benedict V. Safourek
Assistant Examiner—Tesfaldet Bocure
Attorney, Agent, or Firm—Blakely, Sokoloff, Taylor & Zafman

[57] ABSTRACT

An integrated circuit for recovering the clock and data information from phase-encoded serial data. The circuit includes a synchronous delay line coupled to a waveform digitizer and a waveform synthesizer. The waveform digitizer receives and converts the phase-encoded data into a string of bits whose value represent the logic levels of an encoded data at $T_p/N$ intervals where $T_p$ is the reference clock period and N is the resolution of the waveform digitizer. The encoded data may be one of several phase-encoded serial data such as Manchester coding. The digitized output from the waveform digitizer is input to a transition detector, where the locations of the transitions (bit-boundary transitions and bit-center transitions) of the digitized encoded data are extracted. An AND stage comprising N AND gates is coupled to the waveform digitizer and the waveform synthesizer for masking out the bit-boundary transitions and passes the bit-center transitions. The output from the AND stage (a binary word) is coupled to a pair of encoders. The encoders are coupled to an adder and an L-type register which are used for compensating for missing bit-center transitions or for the presence of two bit-center transitions. A digital filter coupled to the L-type register allows the present invention to achieve lockon immediately and to filter out phase jitter. The digital filter is further coupled to a shifter in the waveform synthesizer for synthesizing the clock information of the encoded data on one hand, and for providing mask bits to the AND stage on the other hand. The clock information of the encoded data is synthesized by the shifter in the waveform synthesizer over a digital-to-time domain converter in the waveform synthesizer. Finally, the data information of the phase-encoded serial data is regenerated by a D-type flip flop which receives encoded data over a delayed stage from its D input and also receives the clock information over its clock input.

12 Claims, 11 Drawing Sheets

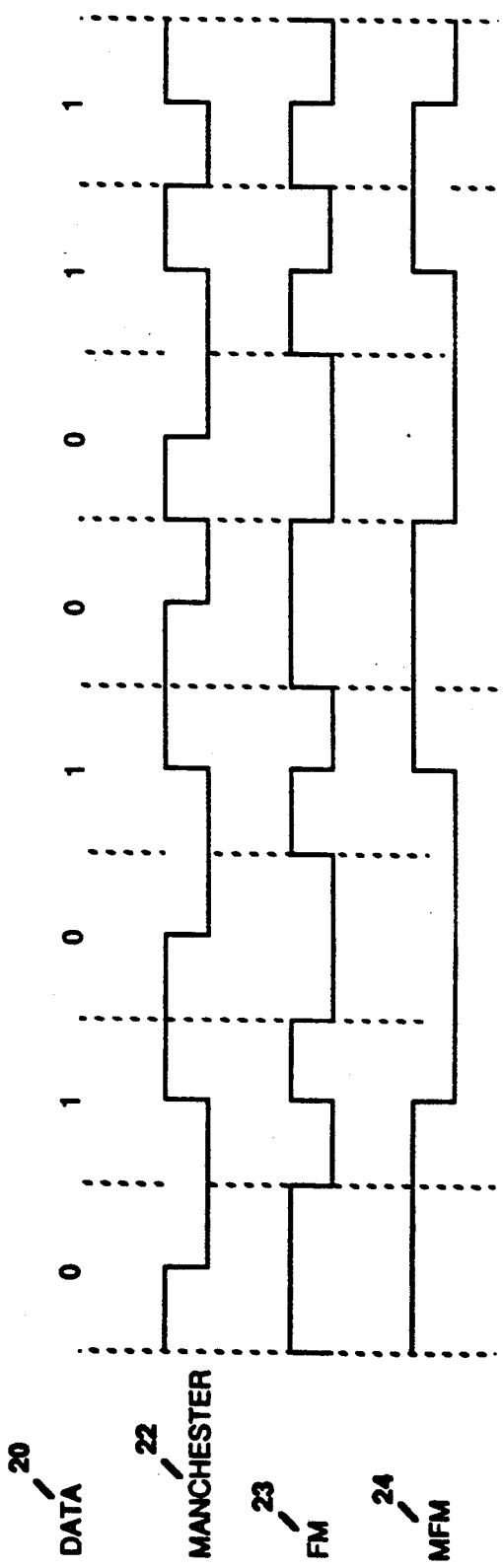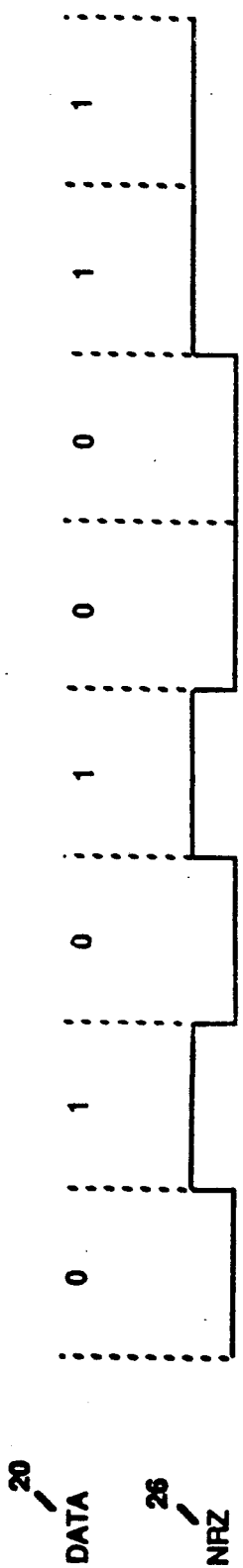
Fig. 1A
Fig. 1B

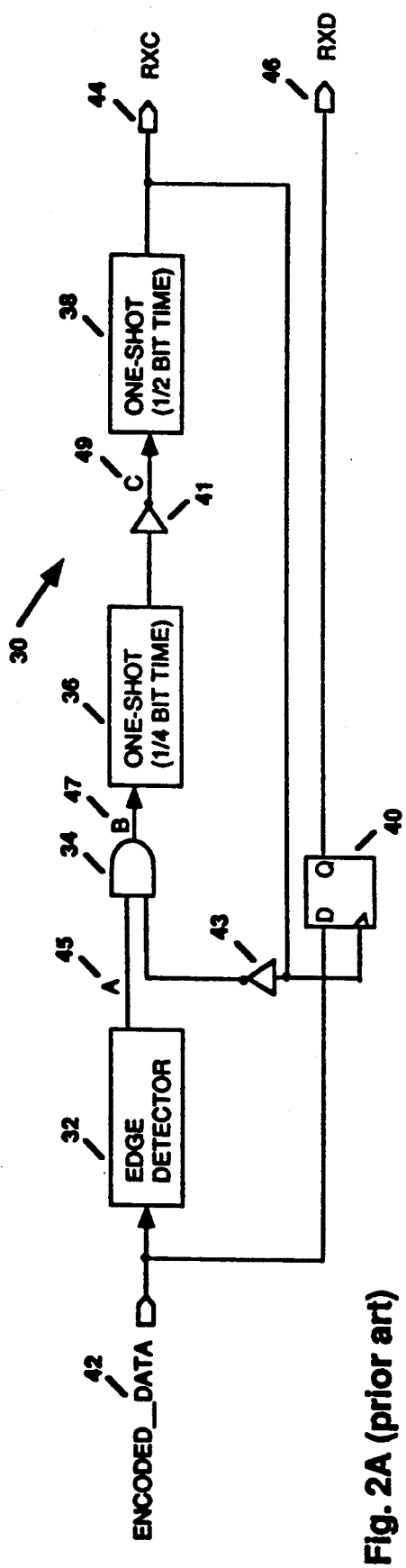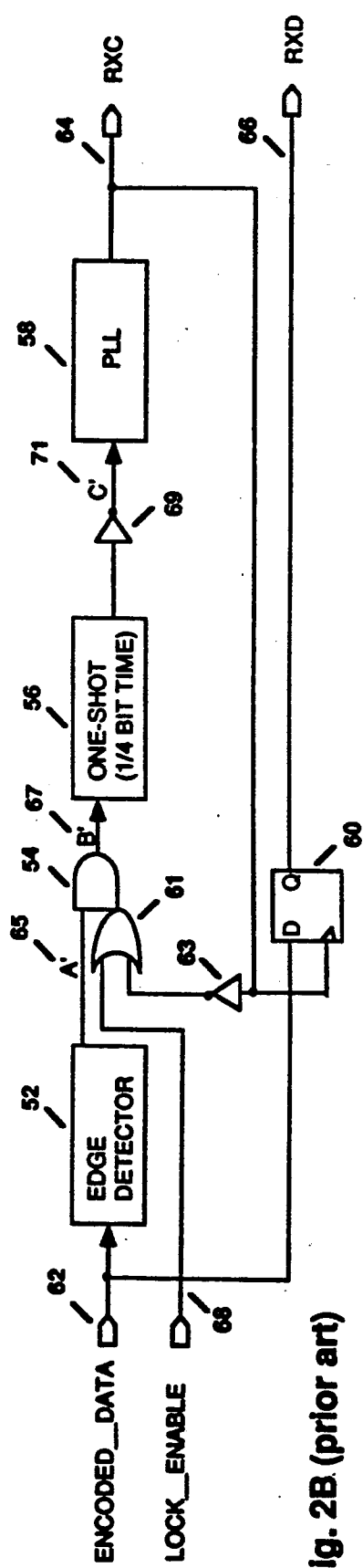
Fig. 2A (prior art)
Fig. 2B (prior art)

DIGITIZER OUTPUT AS FUNCTION OF PHASE DIFF.

| CLOCK | 0° | 90° | 180° | 270° |
|---|---|---|---|---|
| n | 1100 | 1000 | 0000 | 0001 |
| n+1 | 0011 | 0111 | 1111 | 1110 |
| n+2 | 1100 | 1000 | 0000 | 0001 |
| n+3 | 0011 | 0111 | 1111 | 1110 |
| n+4 | 1100 | 1001 | 0011 | 0110 |
| n+5 | 1100 | 1000 | 0000 | 0001 |
| n+6 | 0011 | 0110 | 1100 | 1001 |
| n+7 | 0011 | 011- | 11-- | 1--- |

Fig. 11 — EXAMPLE FOR N = 8

BIT-CENTER TRANSITION (126) / SHIFTED PATTERN (MASK) (118)

| BIT | 0 | 1 | 2 | 3 | 4 | 5 | 6 | 7 |
|---|---|---|---|---|---|---|---|---|
| 0 | 0 | 0 | 1 | 1 | 1 | 1 | 0 | 0 |
| 1 | 0 | 1 | 1 | 1 | 1 | 0 | 0 | 0 |
| 2 | 1 | 1 | 1 | 1 | 0 | 0 | 0 | 0 |
| 3 | 1 | 1 | 1 | 0 | 0 | 0 | 0 | 1 |
| 4 | 1 | 1 | 0 | 0 | 0 | 0 | 1 | 1 |
| 5 | 1 | 0 | 0 | 0 | 0 | 1 | 1 | 1 |
| 6 | 0 | 0 | 0 | 0 | 1 | 1 | 1 | 1 |
| 7 | 0 | 0 | 0 | 1 | 1 | 1 | 1 | 0 |

CMOS DIGITAL CLOCK AND DATA RECOVERY CIRCUIT

BACKGROUND OF THE INVENTION

1. Field of the Invention

This invention relates to the field of recovering clock and data information from serial data that has been phase-encoded for subsequent digital processing in an integrated circuit, and, in particular, for metal oxide semiconductor (MOS) circuits.

2. Art Background

It is quite common for data communication equipment to transmit and receive serial data that has been phase-encoded. Phase-encoded data is data that has the synchronization information (i.e., clock) encoded together with the data in a single stream of pulses or frames. Because the clock and data information is combined, only a single transmission medium, for example, co-axial cable, twisted pair, or optic fiber, is required to transmit the data from point to point. Circuits that recover clock and data information from a phase-encoded serial data are most useful where the clock frequencies of the transmitting equipment and that of the receiving equipment are matched to a small tolerance. This stringent requirement is incorporated in Local Area Network (LAN) data communication standards such as Carrier-Sense-Multiple Access with Collision Detection (CSMA/CD) and Fiber Distributed Data Interface (FDDI). Phase-encoded serial data is also used in data transfer between disk memories and host computers.

Two common methods are used to recover data and clock information from phase-encoded serial data: the one-shot method and the phase-locked loop (PLL) method. The one-shot method is simple to implement but has poor tolerance to phase jitter. The phase-locked loop method has good tolerance to phase jitter but is difficult to implement. Phase jitter is the variation in the location of transitions of a stream of pulses or frames from bit to bit. The tolerance to phase jitter is defined as the permitted range of time over which a transition can still be received correctly, divided by the data bit-cell period. Hence, the phase-jitter tolerance is measured as a fraction of a bit time. In the case of the one-shot method, the theoretical upper bound in phase jitter tolerance is $\pm\frac{1}{4}$ bit time, although practical implementation limitations reduce this tolerance even further. In contrast, the upper bound in phase-jitter tolerance of the PLL method is $\pm\frac{1}{4}$ bit time. The greatest disadvantage of the PLL method, however, is its sensitivity to parameter variations, and, as such, it is difficult to manufacture in MOS on account of the large variability of the MOS technology. Thus, implementing the PLL method in MOS requires the delicate trade-off between maintaining the stability of the PLL and achieving maximum phase jitter tolerance. Finally, the PLL method requires additional circuitry to ensure the correct masking operation is performed in recovering the clock information from the phase-encoded data. In a masking operation, a mask bit is combined with the phase-encoded data to extract the locations of the transition of the phase-encoded data. Under the PLL method, a special lockon enabling signal is required. In contrast, the one-shot method achieves lockon automatically.

It is an object of the present invention to recover digital clock and data information from phase-encoded serial data with the maximum phase-jitter tolerance but without the sensitivity to variation in processing, temperature and supply.

It is another object of the present invention to implement the recovery of clock and data information from a phase-encoded serial data in a MOS circuit.

It is yet another object of the present invention to achieve lockon rapidly while immunizing the invention from variations in processing temperature or voltage supply.

SUMMARY OF THE INVENTION

An integrated circuit is disclosed for recovering the clock and data information from a phase-encoded serial data. The circuit includes a synchronous delay line (SDL) coupled to a waveform digitizer and a waveform synthesizer. The waveform digitizer receives and converts an encoded data into a string of N bits whose value represent the logic levels of an encoded data at $T_p/N$ intervals, where $T_p$ is the clock period of the present invention and N is the resolution of the waveform digitizer. The encoded data may be one of several phase-encoded serial data such as Manchester coding. The digitized output from the waveform digitizer is input to a transition detector, where the locations of the transitions of the digitized encoded data are extracted. The transitions comprise bit-boundary transitions and bit-center transitions. An AND stage is coupled to the waveform digitizer and the waveform synthesizer for masking out the bit-boundary transitions and passing the bit-center transitions. The AND stage combines the locations of the transitions of the digitized encoded data from the transition detector with N mask bits provided by a pattern generator in the waveform synthesizer. A pair of encoders coupled to an adder and an L-type register are used for a missing bit-center transition or the presence of two bit-center transitions caused by phase jitter. The output of the L-type register is input to a digital filter for filtering out rapid variations in the encoded locations of the bit-center transitions but passes slow variations therein. The digital filter also achieves lockon instantaneously. The outputs from the digital filter are coupled to a shifter in the waveform synthesizer the clock information of the encoded data on one hand, and for providing mask bits to the AND stage on the other hand. The clock information of the encoded data is synthesized by the shifter in the waveform synthesizer over a DTC in the waveform synthesizer. Finally, the data information of the phase-encoded serial data is regenerated by a D-type flip-flop which receives encoded data over a delayed stage from its D input and also receiving the clock information over its clock input. Thus, the present invention recovers clock and data information from phase-encoded serial data with their phase-jitter tolerance comparable to those in the prior art and implementable entirely in MOS technology.

BRIEF DESCRIPTION OF THE DRAWINGS

FIG. 1A is a timing diagram of a few popular phase encoding schemes such as Manchester encoding, frequency modulation, and Miller encoding.

FIG. 1B is a timing diagram of a non phase-encoding scheme such as Non-Returned-to-Zero (NRZ).

FIG. 2A is a block diagram illustrating one prior art—the one-shot method—of recovering clock and data information from a phase-encoded data.

FIG. 2B is another block diagram illustrating another prior art——PLL method—of recovering clock and data information from phase-encoded data.

FIG. 11 is a timing diagram of the inputs into and outputs from the shifter used in the waveform synthesizer in the preferred embodiment of the present invention.

DETAILED DESCRIPTION OF THE INVENTION

Figure 3:
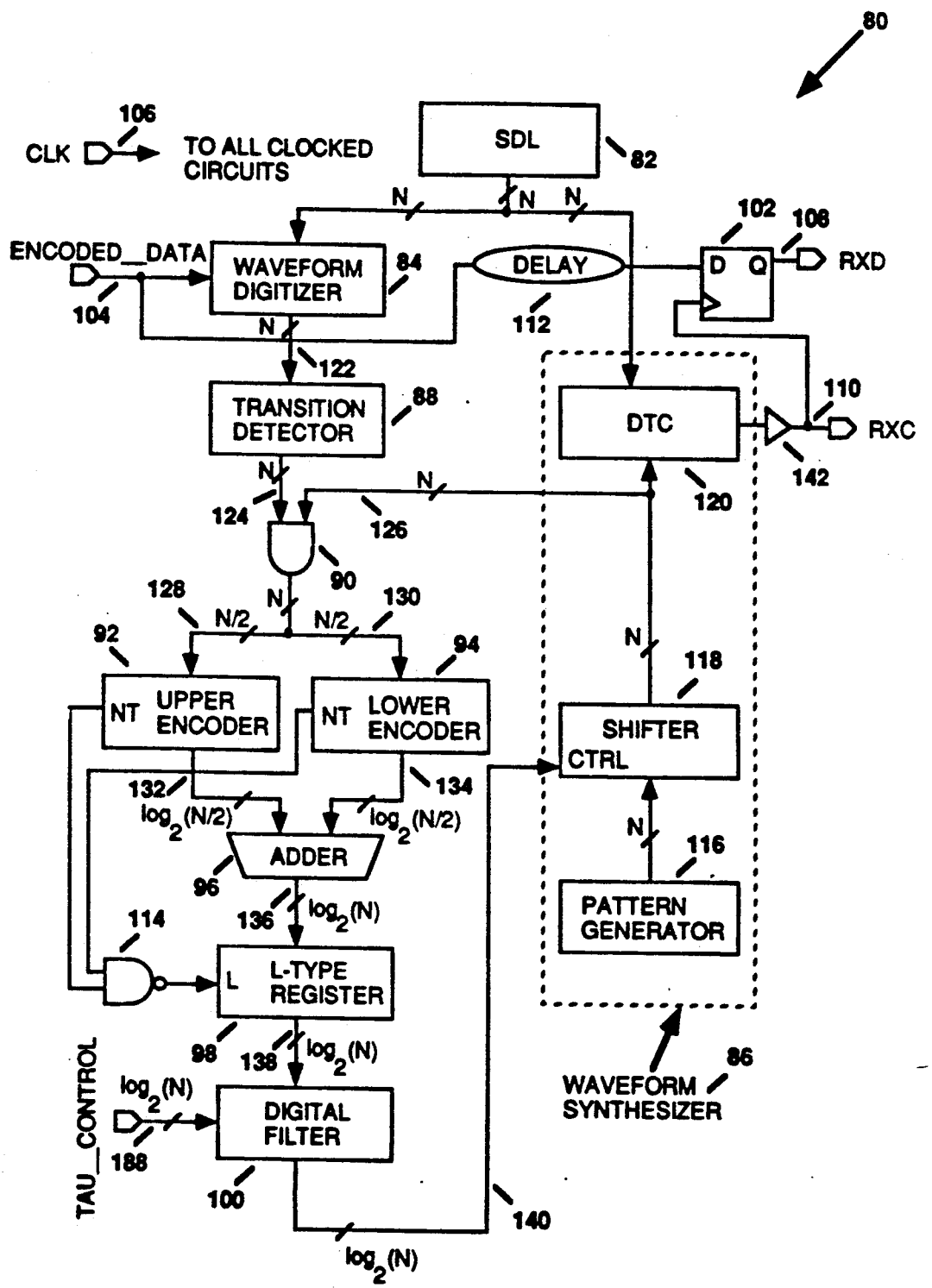
FIG. 3 is a block diagram illustrating the preferred embodiment of the present invention.

An integrated circuit is disclosed for recovering the clock and data information from a phase-encoded data. In the following description, numerous specific details are set forth such as specific circuits in order to provide a thorough understanding of the present invention. It will be obvious, however, to one skilled in the art that the present invention may be practiced without these specific details. In other instances, well known circuits are not described in detail in order not to unnecessarily obscure the present invention. In the presently preferred embodiment, the invention is realized as part of a metal oxide semiconductor (MOS) integrated circuit. The invention may be fabricated using any of the many well-known MOS processes or complementary metal oxide semiconductors (CMOS) processes.

Recovering the clock and data information from phase-encoded data is most useful in a data communication environment where the clock frequencies of the transmitting station and the receiving station are matched to a small tolerance. Examples of such data communication environment are local area network data communication standards such as Carrier-Sense-Multiple Access with Collision Detection (CSMA/CD) and fiber distributed data interface (FDDI). Phase encoded data is also used in data transfer between disk memory and host computers. Phase encoded data is data that has synchronization information (i.e., clock) encoded together with the data in a single stream of pulses. As such, only a single transmission medium, for example co-axial cable, twisted pair or optical fiber is required to transmit the data from point to point. Several different types of phase encoding schemes exist and are shown in FIG. 1A. Some of the more popular ones are: bi-phase-level encoding (also known as Manchester encoding), bi-phase-mark encoding (also known as frequency-modulation or FM) and delay-modulation (also known as Miller encoding or Modified FM (MFM)). See FIG. 1A for the timing diagram of the various phase encoding schemes. The alternative to phase-encoded data is non-return-to-zero (NRZ) encoding where the data is transmitted without any synchronization information. See FIG. 1B for a timing diagram of NRZ. Under NRZ two transmission media—one for the data, one for the clock—are required. Therefore, NRZ encoding schemes are considerably more expensive than phase-encoding schemes.

Two principal methods used to recover the clock and data information from phase-encoded data are: the one-shot method and the phase locked loop (PLL). The one-shot method is simple to implement but has poor tolerance to phase jitter. The PLL method has good tolerance to phase jitter but is difficult to implement. In an ideal digital transmission system, the pulses of the digital pulse stream such as the phase-encoded data stream in the present invention, would arrive at times that are integer multiples of the pulse repetition period $T_p$. However, in real systems, pulses arrive at times that differ from the integer multiples of $T_p$. Phase jitter is the variation in the location of transitions of an actual digital transmission system from an ideal digital transmission system. Tolerance to phase jitter is defined as the permitted range of time over which a transition can still be received correctly, divided by the data bit-cell period $T_p$, and is measured as a fraction of the bit time. See, Trischitta, P., Varma, E. *Jitter in Digital Transmission Systems* (Artech House, Inc.; 1989), Chapter 1.

The discussion of the prior art methods and the detailed description of the present invention for recovering the clock and data information from phase-encoded data are described with reference to Manchester-encoding scheme. It should be understood by one skilled in the art that the choice of Manchester-encoding scheme is for illustration purposes only and should not serve as a limitation upon the present invention. It should also be understood by one skilled in the art that the choice of Manchester-encoding scheme is to differentiate phase encoding schemes from non phase encoding schemes such as NRZ. Furthermore, the recovery methods for other phase encoding schemes are very similar to Manchester-encoding scheme and differ only in detail but not in substance.

Manchester code is representative of a class of self-clocking binary codes. Under Manchester encoding, the first half of the bit cell contains the complementary data and the second half contains the true data. Thus, there is always a transition in the center of the bit cell, called bit-center transitions. At the same time, there are at least two boundary-transitions in connection with each frame. At the beginning of the frame, a series of alternating 1's and 0's (preamble) signal is sent which has no boundary transitions. Manchester clock and data recovery takes place by first recovering the clock and then using the clock to recover the data from the encoded data stream. See, *"Carrier Sense Multiple Access with Collision Detection* (CSMA/CD), ANSI/IEEE Standard 802.3.

FIG. 2A is a block diagram illustrating the prior art one-shot method 30 to recover the clock and data signal from a phase-encoded data. An example of a one-shot method is described in Bell, A.G., Borriello, G., *A Single Chip NMOS Ethernet Controller* (IEEE International Solid-State Circuits Conference Digest: 1983), pp. 70-71. Referring again to FIG. 2A, the one-shot method 30 comprises an edge detector 32, an AND gate 34, one-shot circuit 36, another one-shot circuit 38, and a D-type flip-flop 40. The edge detector 32 and the D-type flip-flop 40 receive the phase-encoded data 42. The edge detector 32 is a one-shot that is triggered by either a rising edge or a falling edge. The edge detector 32 provides the edges for triggering the other circuits in the one-shot method 30. To recover the clock information from the phase-encoded data, it is necessary to mask out the bit-boundary transitions from the bit-center transitions. An AND gate 34 is used to pass signal A 45 only during intervals in which bit-center transitions can occur. The interval during which bit-center transitions are allowed to pass is the period from $\frac{1}{4}$ bit-time to $\frac{3}{4}$ bit-time. Outside of this interval, signal 45 is masked out since it is assumed that any transitions outside of this interval are bit-boundary transitions. The AND gate 34 also receives the recovered clock signal 44 which is being inverted by the inverter 43 and also serves as a mask bit for the masking operation. The output of the AND gate is signal B 47 which is a pulse train in which each pulse is located whenever a bit-center transition occurs in the phase-encoded data. Signal B 47 is input to a one-shot circuit 36 whose pulse width is precisely set to $\frac{1}{4}$ bit time. The output of the one-shot circuit 36—after inversion by an inverter 41—is signal C 49. The active edge of signal 49 is further delayed by $\frac{1}{4}$ bit-time from the bit-center transition. Signal 49 is input to another one-shot circuit 38 whose pulse width is precisely set to $\frac{1}{2}$ bit-time. The output of the one-shot circuit 38 is the recovered clock signal 44. The recovered clock signal 44 not only serves as the mask bit for the masking operation, it is input to the clock input of the D-type edge-figure flip-flop 40 for recovering the data information from the phase-encoded data 42. The recovered data 46 is output by the D-type edge-trigger flip-flop 40. As alluded to in the above paragraphs, the one-shot method 30 is simple to implement but has poor tolerance to phase jitter. Like the PLL method to be described further below, the one-shot method is an analog one. As such, the one-shot method is sensitive to noise and jitter over the transmission lines. Although the theoretical upper bounds in phase-jitter tolerance for the one-shot method 30 is $\pm\frac{1}{4}$ bit-time, the actual phase-jitter tolerance is less than $\pm\frac{1}{4}$ bit-time on account of practical limitations, including inaccuracy in the one-shots, inaccuracy in sampling process, flip-flop setup and hold time requirements and so on.

FIG. 2B is a prior art Phase-Locked Loop (PLL) method 70 for recovering clock and data information from phase-encoded data. An example of the PLL method is fully described in Haung, H.M., Banatao, D., Perlegos, G., Wu, T.C., and Chiu, T.L., *A CMOS Ethernet Serial Interface Chip* (IEEE International Solid-State Circuits Conference Digest: 1984) pp. 184-185. Referring again to FIG. 2B, the PLL method 70 comprises an edge detector 52, a one-shot circuit 56, a PLL circuit 58, a D-type flip-flop 60, and an AND gate 54 and an OR gate 61. It should be understood to one skilled in the art that the PLL method 70 is similar to the one-shot method 30 as described in FIG. 2A. The essential differences between the prior art methods as shown in FIG. 2A and FIG. 2B are: (1) a PLL 58 is used in place of the half bit-time one-shot circuit 38, and (2) an additional lock enable signal 68 is required as an input to the PLL method 70. The other difference between the PLL method 70 and the one-shot method 30 is in the manner in which each recovery circuit achieves a lockon. Lock on refers to the initiation of the clock and data recovery process usually by locking onto the bit-center transition of a new frame (i.e., pulse train). The preamble which precedes the actual data in the frame is designed for activating the lockon. Because the recovered clock signal 44 and 64 respectively are used to mask out bit-boundary transitions, it could easily mask out bit-center transition when the recovery circuit is not in a locked condition. In the one-shot method this is not a problem since until the first preamble bit arrives, the recovered clock signal 44 is continuously low, thereby unmasking all incoming bits. When the first preamble bit arrives, lock is immediately achieved and all subsequent masking tasks take place correctly. However, in the PLL method 70 the PLL circuit 58 is free-running. Therefore, when the preamble starts, there is a 50% probability that the recover clock signal 64 of the PLL circuit 58 will mask out the preamble transition thereby preventing the obtaining of lockon. To overcome this problem, a lock enable signal 68 is provided as an input to the AND gate 54 and is activated during the preamble so that no transitions are masked out. By the end of the preamble, lockon will have been achieved and the lock enable signal 68 is de-asserted. The PLL method 70 has greater phase jitter tolerance than that of the one-shot method 30. This improved tolerance stems from the fact that PLL effectively filters out phase jitter so that sudden movements in the bit-center transition from its normal location do not result in commensurate movement in the recovered clock signal 64. The phase jitter tolerance of the PLL method 70 is $\pm\frac{1}{4}$ bit-time. In practice, the actual phase-jitter tolerance of the PLL is less than $\pm\frac{1}{4}$ bit-time on account of practical limitations, inaccuracies in the PLL, inaccuracy in the sampling process, flip-flop setup and hold time requirements and so on. The greatest disadvantage of the PLL method is its sensitivity to parameters variations and therefore it is difficult to manufacture in MOS on account of the large variability of MOS technology. To implement a PLL method in MOS technology, one has to live with the trade-off between the PLL loop stability and achieving good tolerance to phase jitter in spite of large variation in processing and operating conditions. Finally, the PLL method requires additional circuitry to ensure the correct masking operation is performed in recovering the clock information from the phase-encoded data. In a masking operation, a mask bit is combined with the phase-encoded data to extract the locations of the transaction therein. Under the PLL method, a special lockon enabling signal is required to trigger the PLL circuit. In contrast, the one-shot method achieves lockon automatically.

PREFERRED EMBODIMENT OF THE PRESENT INVENTION

FIG. 3 is a block diagram illustrating the preferred embodiment of digital clock and data information recovery circuit 80. The clock and data recovery circuit 80 comprises a synchronous delay line (SDL) 82 being coupled to a waveform digitizer 84 and a waveform synthesizer 86. The waveform digitizer 84 receives an input phase-encoded data 104 and outputs a digitized phase-encoded data to a transition detector 88. The phase-encoded data 104 is also coupled to a D-type flip-flop 102 over a delay stage 112. The output of the waveform synthesizer 86 is the recovered clock signal 110 and is also input to the clock port of the D-type flip-flop 102 in producing the recovered data signal 108. The waveform synthesizer 86 provides mask bits 126 to an AND stage 90. The AND stage 90 further combines the mask bits 126 with the output from the transition detector 88 to initiate the masking operation of the clock and data recovery circuit 80. The output of the AND stage 90 is further coupled to two encoders 92 and 94. This output is a binary word which is N bits wide. The encoders 92 and 94 are further coupled to an adder 96 for averaging the bit-center location of upper and lower portions of the digitized word from the AND gate. The output of the adder 96 is input to an L-type register 98. The encoders 92 and 94 are further coupled to the L-type register 98 over an AND gate 114 for freezing the previous bit-center transition in the absence of the occurrence of any bit-center transition to a digital filter 100. The digital filter 100 receives a control signal 188 for varying the time constant of the output 140 from the digital filter 100. The output signal 140 is input to a shifter 118 in the waveform synthesizer 86 for synthesizing the recover clock signal 110 over the time domain converter (DTC) 120 and over the buffer 142. The shifter 118 further receives mask bits from a pattern generator 116 for providing mask bits for the masking operation in the AND stage 90.

Figure 4:
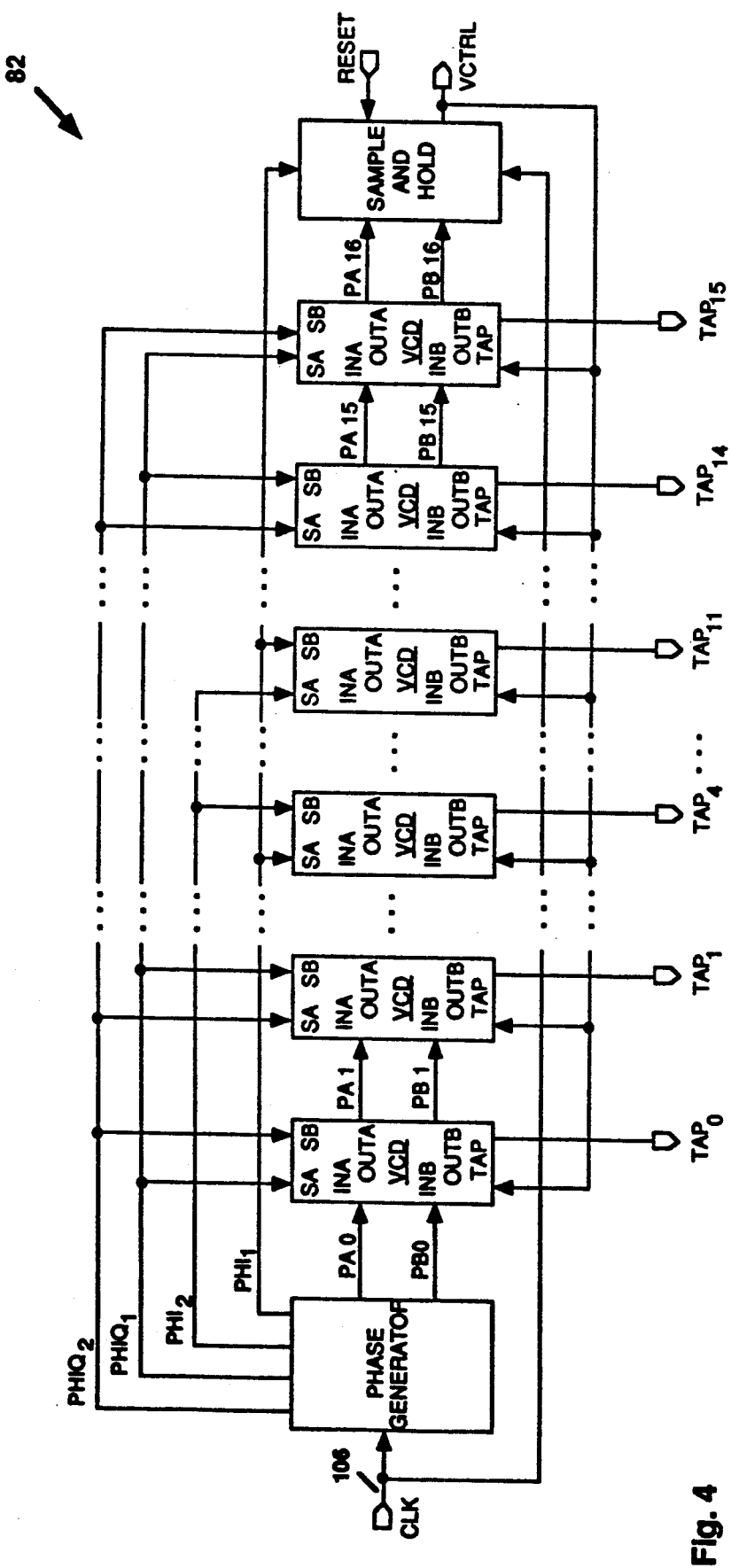
FIG. 4 is an electric schematic of a synchronous delay line (SDL) used in the preferred embodiment of the present invention.

The preferred embodiment of the synchronous delay line (SDL) 82 for use with the present invention is described fully in the pending patent application, Ser. No. 494,130, filed on Mar. 15, 1990 and entitled "CMOS PHASE WAVEFORM DIGITIZER", and in another pending patent application, Ser. No. 07/434,408, filed on Nov. 13, 1989 and entitled "SYNCHRONOUS DELAY LINE WITH QUADRATURE CLOCK PHASES." Although the SDL in 07/434,408 shows eight taps TAP0:7, it should be understood by one skilled in the art that producing N taps, TAP0:N−1, for the presently preferred embodiment merely requires the addition of voltage controlled delay (VCD's) stages. FIG. 4 is a circuit diagram of the SDL used in the preferred embodiment of the present invention. FIG. 4 is the same diagram as FIG. 3A in the pending application, Ser. No. 494,130, filed Mar. 15, 1990, and entitled "CMOS WAVEFORM DIGITIZER." Referring again to FIG. 4, the number of N taps is equal to 16. It should be understood by one skilled in the art that an arbitrary number of taps can be produced. Prior art techniques of utilizing a synchronous delay line are also described in the pending patent application, Ser. No. 07/434,340, filed on Nov. 13, 1989 and entitled "SYNCHRONOUS DELAY LINE WITH AUTOMATIC RESET," in U.S. Pat. No. 4,496,861 entitled "INTEGRATED SYNCHRONOUS DELAY LINE," and in an article entitled "A Novel Precision MOS Synchronous Delay Line," IEEE Journal of Solid State Circuits, Volume SC-20, pp 1265-1271, December, 1985.

Figure 5:
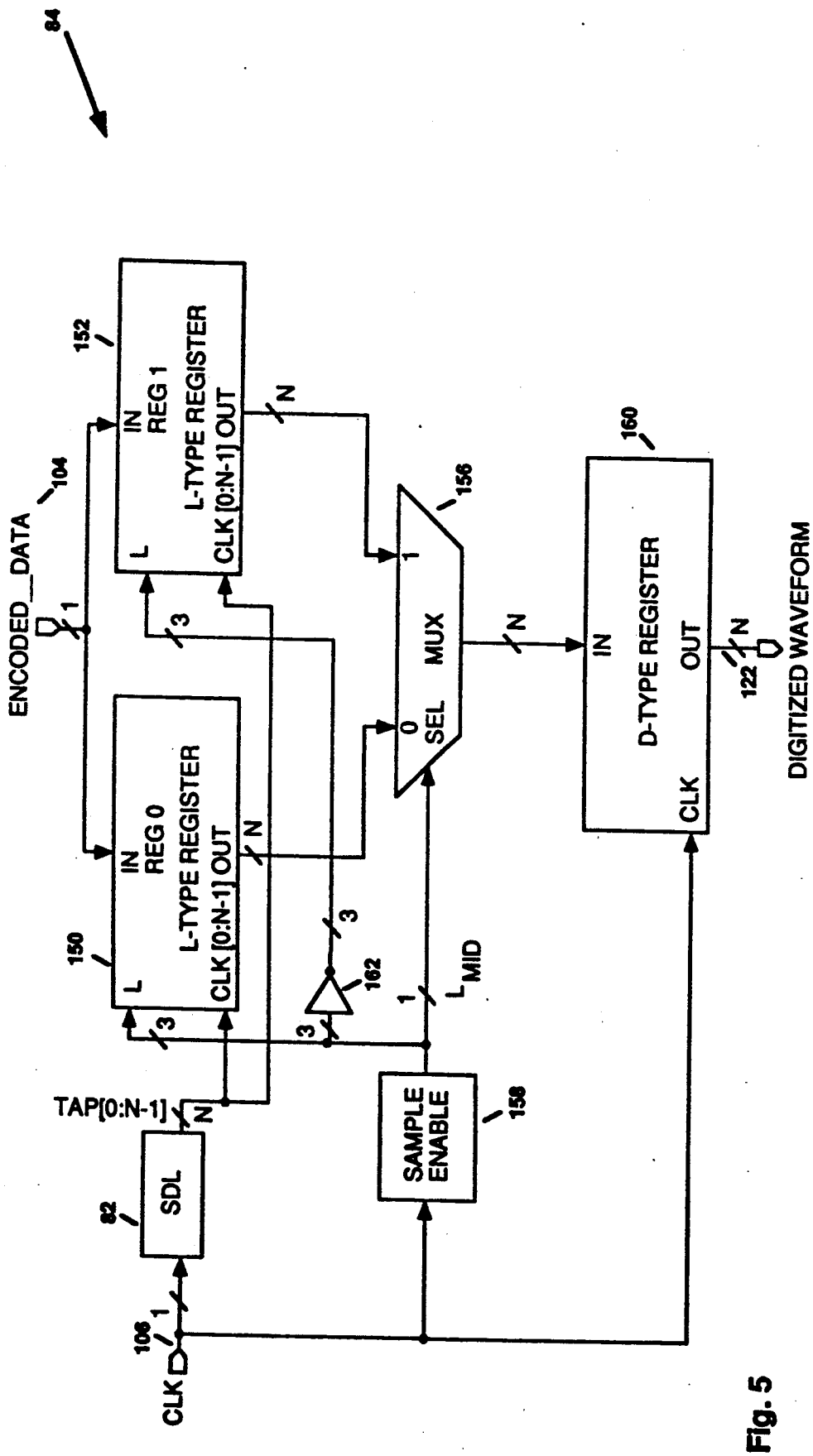
FIG. 5 is an electric schematic of a waveform digitizer used in the preferred embodiment of the present invention.

The preferred embodiment of the waveform digitizer 84 for use with the present invention is described in the pending patent application, Ser. No. 494,130, filed on Mar. 15, 1990 and entitled "CMOS WAVEFORM DIGITIZER." FIG. 5 is a block diagram illustrating the waveform digitizer 84 used in the preferred embodiment of the present invention. FIG. 5 corresponds to FIG. 2 of the pending patent application Ser. No. 494,130 filed Mar. 15, 1990 and entitled "CMOS WAVEFORM DIGITIZER." The waveform digitizer 84 comprises an SDL 82, a pair of L-type registers 150, 152, a sample enable circuit 158, a multiplexer 156, and a D-type register 160. A reference clock 106 is provided as input to the L-type registers 150 and 152 over the SDL 82. The reference clock 106 is also coupled to the L ports of the L-type register over a sample enabling circuit 158. The incoming waveform is input in parallel to both the L-type register 150 and 152. The SDL 82 generates pulses at intervals that are separated by $T_p/N$ where N is the number of taps in the SDL. N corresponds to the equally spaced interval at which the incoming waveform is sampled. The L-type registers 150 and 152 sample the incoming wave according to the control signal provided by the sample enable circuit 158. The control signals are required to guarantee the setup and hold time for the flip-flops in the L-type registers 150 and 152. The outputs from the dual L-type registers 150 and 152 are input to the multiplexer 156 and further to a D-type register before it is outputted as a digitized waveform. Thus, the waveform digitizer 84 provides precise information about the transitions of the incoming waveform suitable for subsequent digital processing.

The preferred embodiment of the waveform synthesizer 86, including the pattern generator 116, the shifter 118, and the digital-to-time-domian converter (DTC) 120 for use with the present invention, are described in the pending patent application, Ser. No. 07/444,670, filed on Dec. 1, 1989 and entitled "METHOD AND APPARATUS FOR SYNTHESIZING DIGITAL WAVEFORMS." Referring again to FIG. 3, the DTC 120 combines the tap signals from the SDL 82 and the shifter output 126 from the shifter 118 to generate a synthesized waveform. The pattern generator 116 provides the mask bits necessary for the masking operation of the clock and data recovery circuit 80 over the shifter 118.

Referring again to FIG. 3, a reference clock 106 having a clock period of $T_p$ is provided to all clock circuits, including the SDL 82, the waveform digitizer 84, the transition detector 88, the L-type register 98, the digital filter 100 and the pattern generator 116. It should be understood by one skilled in the art that the physical connections of the reference clock 106 to all the clock circuits are not shown in order not to unnecessarily obscure the presentation of the present invention. It should also be understood that the reference clock 106, having a clock period $T_p$, is to be distinguished from the frequency of the transmitting station having a clock period of $T_t$. The clock period $T_p$ is just the clock period $T_r$ of the receiving station. Thus, in the preferred embodiment of the present invention, the reference clock $T_p$ and the clock of the receiving station are one and the same. The reference clock 106 is used to synchronize the various circuits of the clock and data recovery circuit 80. Although the transmitting station and the receiving station of a data communication system is not shown in FIG. 3, it should be understood by one skilled in the art that the clock and data recovery circuit 80 of the present invention is coupled to the transmitting and receiving stations. The preferred embodiment of the present invention is particularly suited for recovering clock and data information for phase-encoded data used in a data communication system where $T_t$ and $T_r$ are matched to a small tolerance. However, the phase relationship between $T_t$ and $T_r$ is assumed to be totally random.

Figures 6A, 6B:
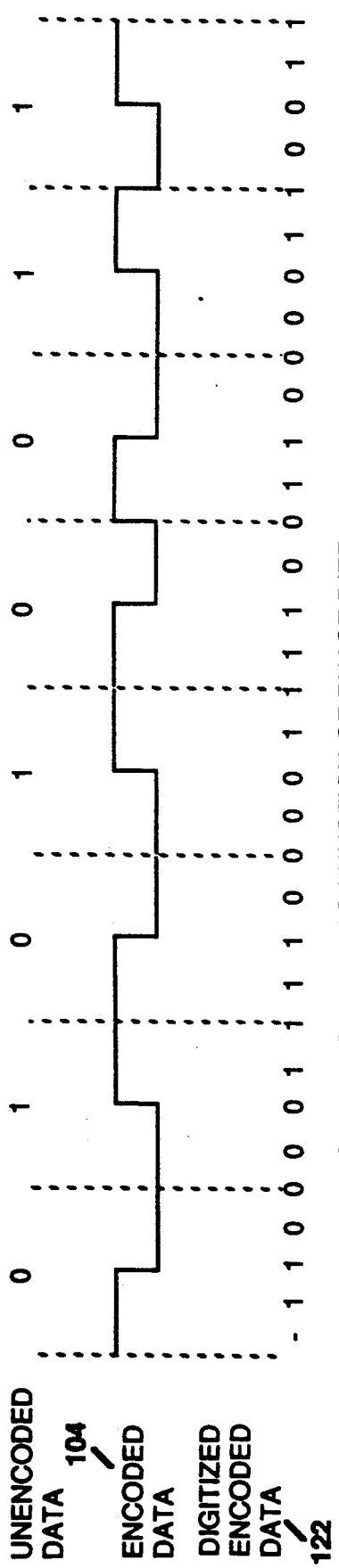
FIG. 6(a) is a timing diagram of the input into and output from the waveform digitizer used in the preferred embodiment of the present invention. The digitized encoded data output from the waveform digitizer is also shown as a function of four different phases in FIG. 6(b).

The phase-encoded data 104 is input to the waveform digitizer 84 which converts the phase-encoded data 104 into strings of bits whose value represents the logic levels of the phase-encoded data 104 at $T_p/N$ intervals, where $T_p$ is the clock period of the clock and data recovery circuit 84, and N is an integer and also the resolution of the waveform digitizer 84. The waveform digitizer receives N precision delay clock pulses from the SDL 82 which provides timing for the digitizing operation. FIG. 6(a) is a timing diagram of the input into and output from the waveform digitizer 84. Unencoded data is shown being encoded under a Manchester encoding scheme producing the phase-encoded data 104. The outputs from the waveform digitizer 84 is the digitized phase-encoded data 122. The digitizing operation of the waveform digitizer 84 takes place with a random phase relationship between the phase-encoded data 104 and the digitizing operation. In other words, the point at which the digitizing operation of the waveform digitizer 84 occurs is unrelated to the phase relationship between the clock in the transmitting station, $T_t$, and the clock in the receiving station, $T_r$. Since this phase relationship is entirely random and unpredictable, the digitizing operation of the waveform digitizer 84 is itself random in terms of where it occurs. However, the fact that the digitizing operation occurs with a random phase relationship with respect to the phase-encoded data 104 is of no consequence. Referring again to FIG. 6(b), the digitized phase-encoded data 122 for four phases—0°, 90°, 180° and 270°—is illustrated under four different columns. In all four cases, it is seen that, when the waveform digitizer output 122 is assembled together in series along a time line of the reference clock (i.e., n adjacent to n+1 and n+2 and so on) that the resulting strings of bits are identical in value. Therefore, the digitizing operation of the waveform digitizer 84 is immune to the phase relationship between the transmitting clock $T_t$ and the receiving clock $T_r$.

Figure 7:
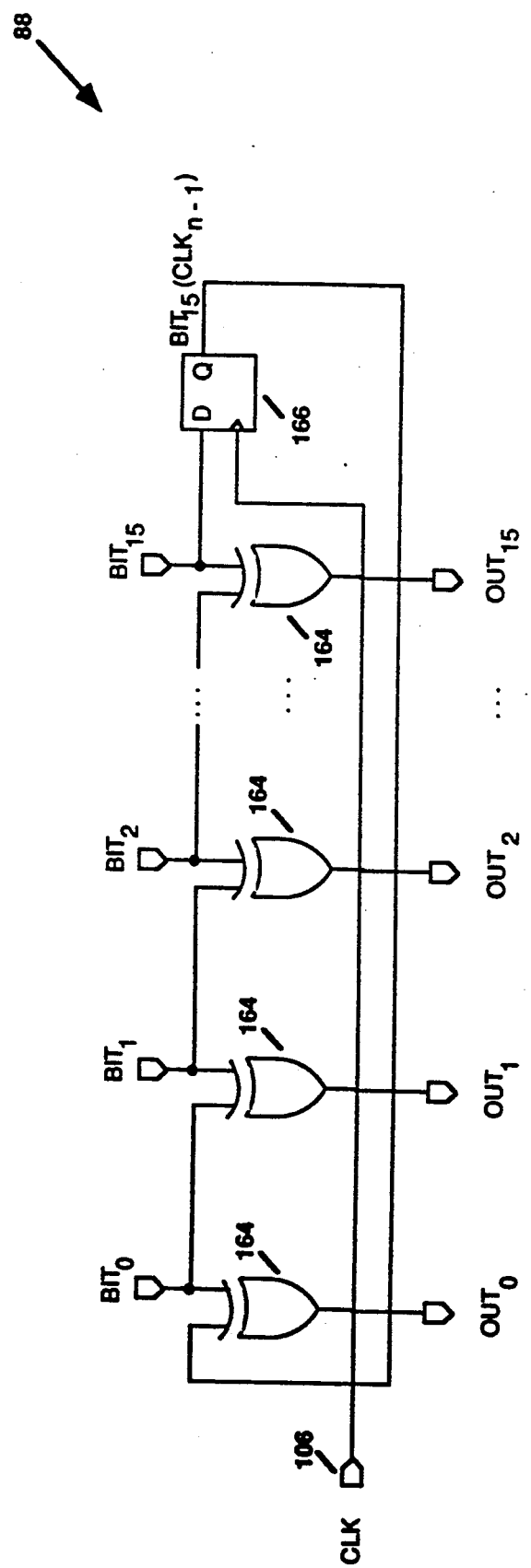
FIG. 7 is an electric schematic of a transition detector used in the preferred embodiment of the present invention.

Referring again to FIG. 3, the output 122 from the waveform digitizer 84 is input to the transition detector 88. The output 122 is the phase-encoded data converted into digitized form. FIG. 7 is a circuit diagram of the transition detector 88 used in the preferred embodiment of the present invention. The transition detector 88 comprises a plurality of XOR gates 164 coupled to a D-type flip-flop 166. The XOR gate 164 of the transition detector 88 receives as input the digitized phase-encoded output 122 from the waveform digitizer 84. The input is also coupled to the D port of the D type flip-flop 166 while the reference clock 106 is coupled to the clock port of the D type register 166. In the preferred embodiment of the present invention, there are N XOR gates, where N is 16. It should be understood by one skilled in the art that the number of XOR gates 164 is a design choice and should not be seen as limitations upon the present invention. The transition detector 88 is responsible for detecting the transitions of the digitized phase-encoded data 122. Whenever a transition (whether it be bit-center or bit boundary transition) occurs, the waveform digitizer 84 produces either a "01" pair of bits or a "10" pair of bits. The XOR gates 164 in the transition detector 88 detect all such pairs of bits in the digitized phase-encoded output 122. The output 124 from the transition detector 88 is thus the location of all the transitions of the digitized phase-encoded data 122.

Figure 8:
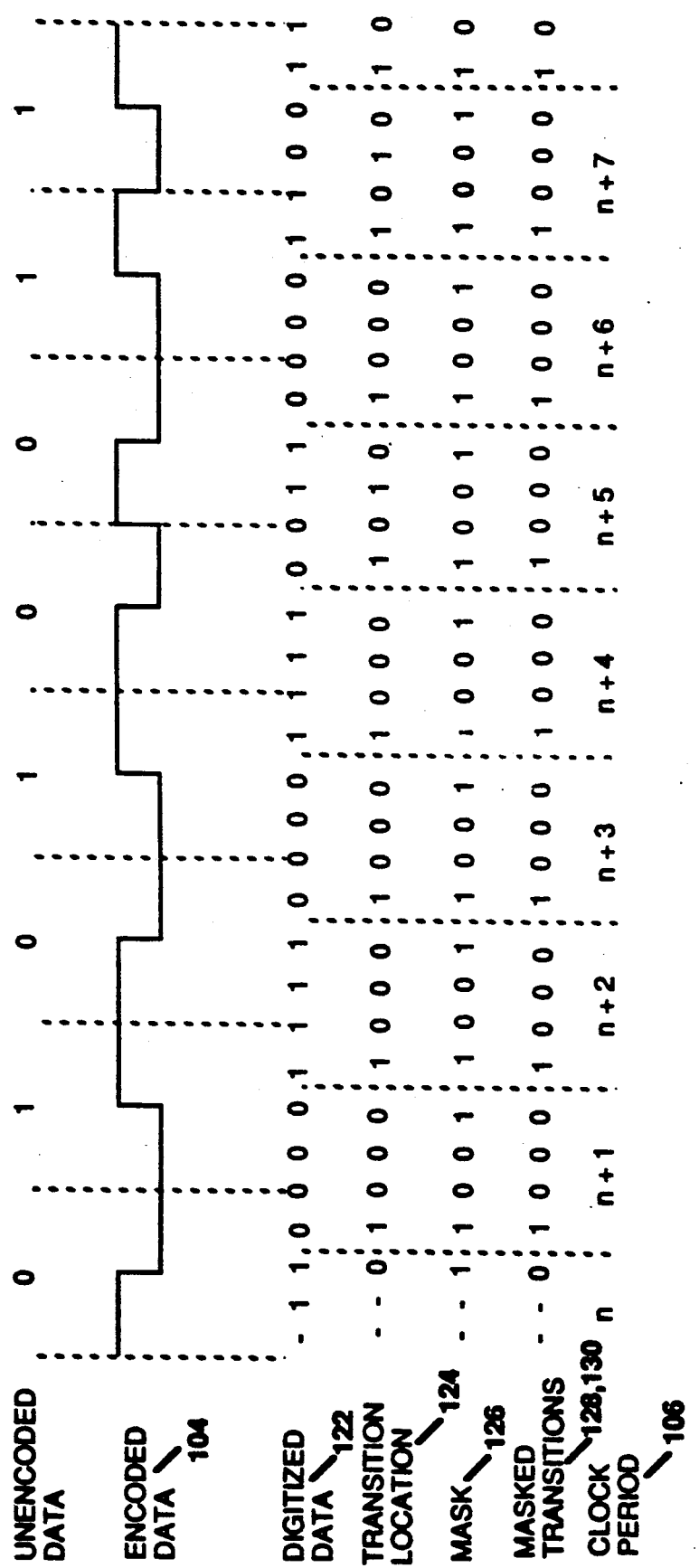
FIG. 8 is a timing diagram of the inputs into and outputs from the waveform digitizer, the transition detector, and the AND stage used in the preferred embodiment of the present invention where no phase jitter occurs.
Figure 9:
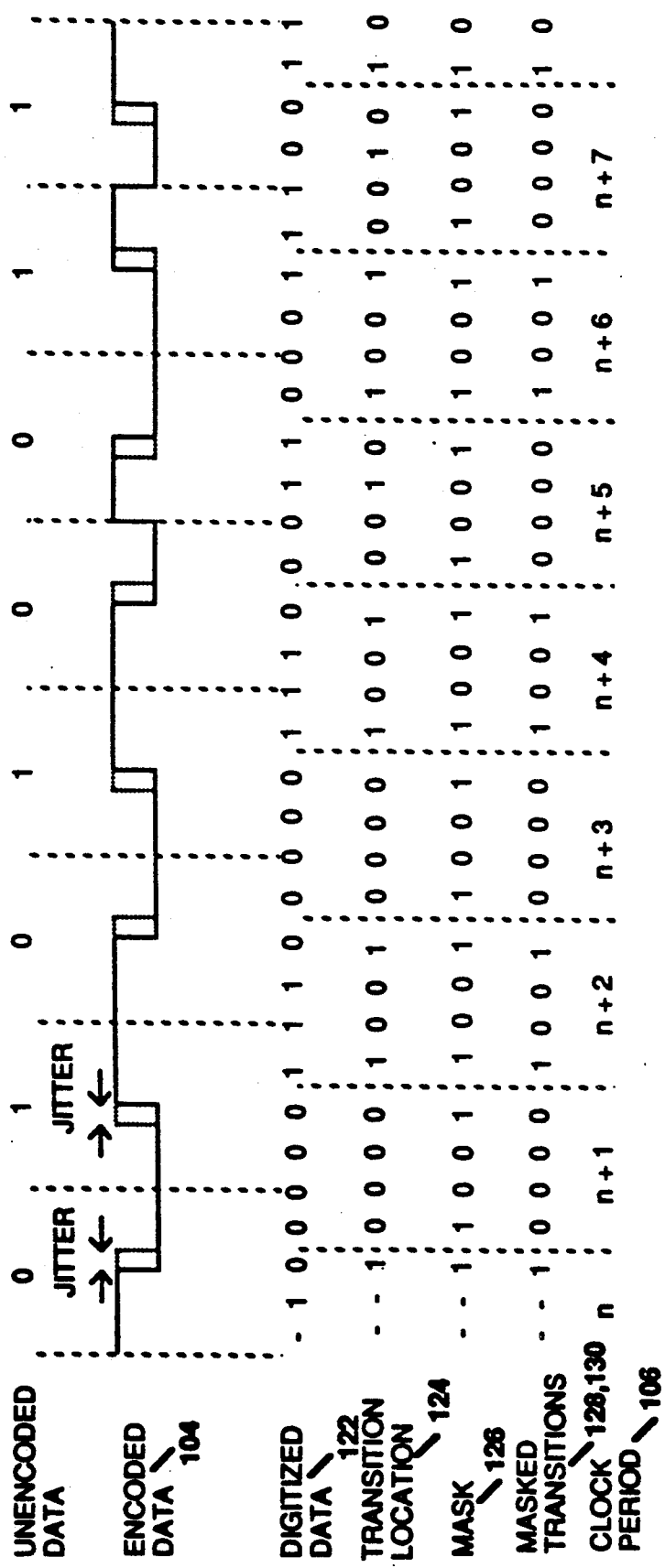
FIG. 9 is a timing diagram of the inputs into and outputs from the waveform digitizer, transition detector and AND stage used in the preferred embodiment of the present invention when phase jitter occurs.

Referring again to FIG. 3, the transition detector 88 is coupled to an AND stage 90 receiving two inputs: (1) the output 124 from the transition detector 88 and (2) the mask bits 126 from the waveform synthesizer 86. The manner in which the waveform synthesizer 86 generates the mask bits 126 will be described further below. The AND stage 90 comprises N AND gates—one gate for each mask bit. The AND stage 90 performs the masking operations where the bit-boundary transition is masked and the bit-center transition is passed on unmodified. FIG. 8 is a timing diagram of the input into and output from the transition detector 88 and the AND stage 90 used in the preferred embodiment of the present invention where there is no phase jitter. FIG. 9 is another timing diagram of the input into and output from the transition detector 88 and the AND stage 90 used in the preferred embodiment of the present invention where there is phase jitter. The digitized phase-encoded data 122 is shown as strings of 0's and 1's, and the transitions ("01" pairs of bits or "10" pairs of bits) are located and outputted as transition location 124. Mask bits 126 are provided by the waveform synthesizer 86. The results of the AND stage 90 of combining the transition location 124 and the mask bits 126 is shown as mask transitions 128 and 130 in FIG. 8. The output masked transition is a binary word of N bits in length. The masking operation performed by the AND stage 90 forces all bits that are not within a phase-jitter tolerance or window of $\pm \frac{1}{4}$ bit time around the bit center to low irrespective of the logical value before the masking operation. Since only bit-boundary transitions occur outside of this window, they are always forced low, while bit-center transitions are passed unmodified. Thus, in the absence of any frequency or phase variation as illustrated in FIG. 8, only one of the N bits output from the masking operation on each clock would be high while all the other N−1 bits would be low.

Although phase jitter is a random function of time or stochastic process with respect to the masking operation performed by the clock and data recovery circuit, there is generally a situation where either two 1's or no 1's could be output from the masking operation. This special situation occurs when the phase difference between the transmitting clock and receiving clock is approximately $\frac{1}{2}$ bit time, i.e. around 180°. In this situation, the bit-center transition would appear either at or near the least significant bit or near the most significant bit in the digitized waveform. This situation can be verified by comparing the timing diagrams of the AND stage 90 in FIG. 8 where no phase jitter occurs and FIG. 9 where jitter occurs. In FIG. 8 where no phase jitter occurs, the output masked transition 128, 130 has one transition per clock cycle, whereas in FIG. 9 where jitter occurs, there may be as many as two transitions per clock cycle or as few as zero transitions per clock cycle. At the same time, we know that when two bit-center transition occur in a single digitized waveform, the transitions always occur in opposite halves of the waveform. Therefore, the location of all bit-center transitions—0, 1 or 2—are encoded using two encoders with each encoder encoding only $\frac{1}{2}$ of the binary word digitized output from the AND stage 90. This digitized output is a binary word having an upper half 128 and a lower half 130. As such, the output masked transition 128 and 130 from the AND stage 90 is coupled to an upper encoder 92 and a lower encoder 94. As the name implies, encoder 92 encodes the upper half of the binary word, and the encoder 94 encodes the lower half of the binary word. Encoder 92 outputs all 0's when there is no 1 input to the encoder, and encodes the input and then adds the number $(N/2-1)$ to the encoded input when there is a 1 input to the encoder. Encoder 94 is a generic encoder. The encoders 92 and 94 are coupled to an adder 96. The output from the encoder 92 and 94 represents the value of the masked transition 128 and 130 from the AND stage 90. The adder 96 adds together the value to produce an average value of the locations of the two transitions. The adder 96 is further coupled to the digital filter 100 over an L-type register 98. Where no jitter occurs in the data transmission, the output from the adder 96 is input to the digital filter 100 unimpeded. Where jitters cause no transition to occur in the data transmission, the encoders 92 and 94 output a no transition (NT signal) to the L-type register 98 over an AND gate 114 to indicate that no bit-center was detected in its respective half of the digitized word. For example, say N=32, and that two bit-center transitions were detected at location 29 and 3. An analysis shows that there are two bit-center transitions having an average location of zero and a jitter of ±3. Therefore, one expects the output of the adder to be zero—the average location of the bit-center. The upper encoder 92 would output 11101 (binary code of 29), while the lower encoder 94 would output 00011 (binary code for 3). The adder 96 would add the two together to give 100000 (binary code of 32). Only the first five bits, however, of the adder 96 are used, so the adder outputs 00000, as expected. In the case where one of the encoders detects no transition, the encoder outputs 00000. If both encoders detect no transition, then the L-input to the L-type register 98 is de-asserted and the output of the L-type register 98 is not updated. By not updating the L-type register 98, the value of the bit-center location that is output is the same as on the previous clock period. Since the absence of any transition in one clock is always counter-balanced by the presence of two transitions in another clock (almost always the previous clock) this "freezing" of the L-type register 98 effectively gives the value from the previous clock weight of 2. since the previous clock most likely has two transitions in it, this doubling of its weight is proper.

Figure 10:
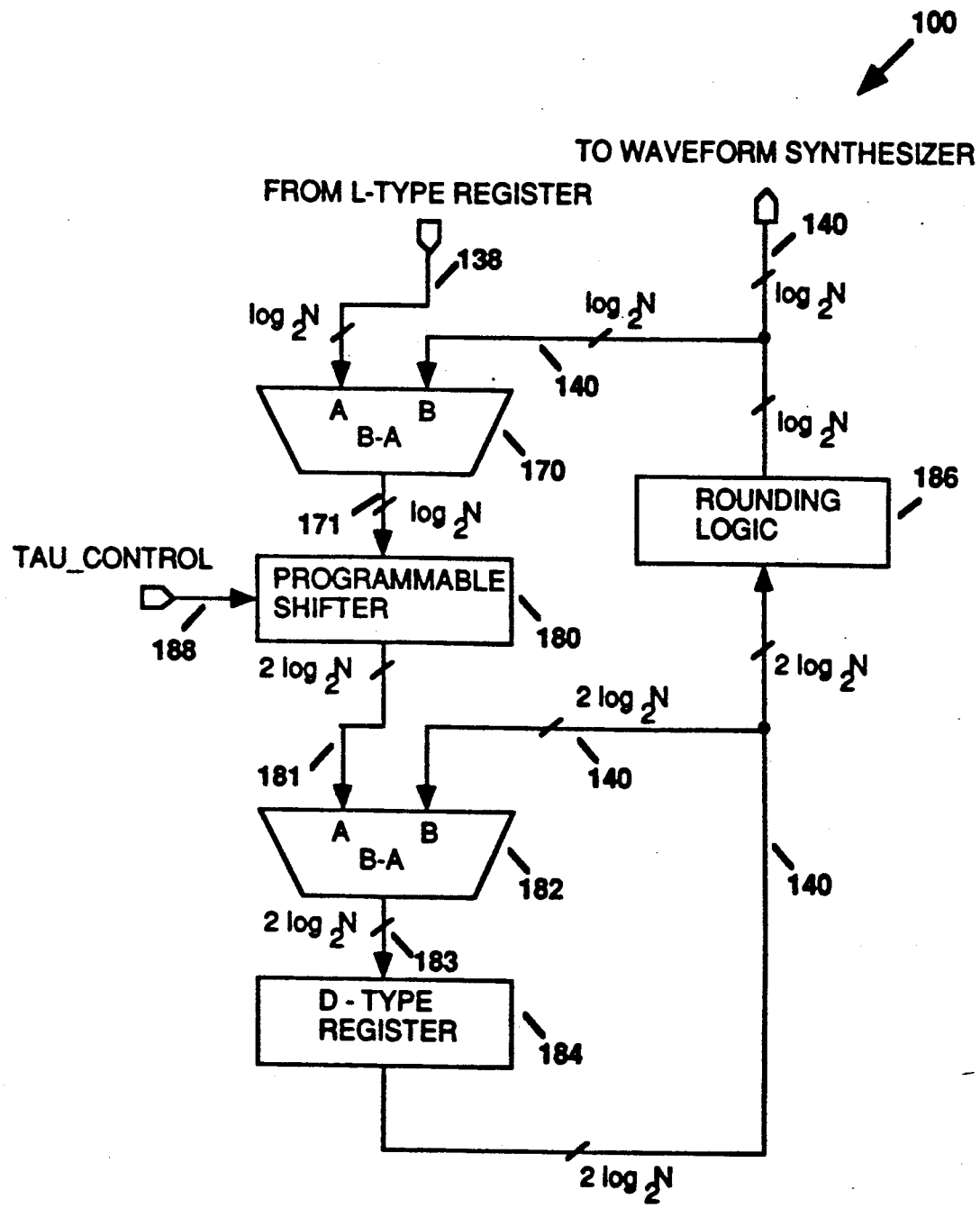
FIG. 10 is an electric schematic of a digital filter used in the preferred embodiment of the present invention.

FIG. 10 is an electric schematic of the digital filter 100 used in the preferred embodiment of the present invention. The digital filter 100 comprises adders 170, 182, and a programmable shifter 180, a D-type register 184 and a rounding logic 186. The digital filter 100 receives the output 138 of the L-type register 98 as input. The subtractor 170 subtracts a digital filter output 140 from the input 138 to generate an error value 171. This error value 171 corresponds to the amount by which the newest value of the bit-center location differs from the value obtained by weighted-averaging of all previous values of the bit-center location. The error value 171 is attenuated by the programmable shifter 180 which shifts the error 171 to the right by S places, thereby attenuating the error by $\frac{1}{2}^S$. A control signal TAU_CONTROL 188 is provided to the programmable shifter 180 for varying the shift amount by changing the time constant $\tau$ of the digital filter 100. TAU_CONTROL 188 varies S from zero to $\log_2 N$, where N is the number of bits in the digitized waveform. The programmable shifter 180 produces an attenuated error 181. The subtractor 182 subtracts the digital filter output 140 from the attenuated error 181 to generate an updated filter output 183 which is stored in a D-type register 184 on each clock. The digital filter output 140 is input to the rounding logic 186 in producing the output for the digital filter 140.

In equation form, the output OUT 140 and the input IN 138 of the digital filter 100 are related by Equation (1) (where $\alpha$ is given by $1/(1-2^{-S})$):

$$OUT(n) = \alpha^{-n}OUT(0) + (\alpha - 1)\sum_{k=0}^{n-1}\alpha^{k-n}IN(k) \quad (1)$$

It should be understood by one skilled in the art that equation (1) has a form of a low-pass filter. For the case of a step-function input, Equation (1) simplifies to Equation (2):

$$OUT(n) = \alpha^{-n}OUT(0) + (1-\alpha^{-n})IN \quad (2)$$

With n in Equation (2) replaced by $t/T_p$ where $T_p$ is the reference clock period of the clock and data recovery circuit 100 of the present invention, Equation (2) becomes:

$$OUT(n) = e^{-t/\tau}OUT(0) + (1-e^{-t/\tau})IN \quad (3)$$

where $\tau$ is the filter's time constant and N is given by $T_p/\log \alpha$. It can be seen that Equation (3) provides that if the input suddenly becomes IN then the output OUT would asymptotically attain the value of IN with time constant $\tau$. This behavior is exactly the behavior of an ordinary low pass filter such as an RC filter.

The programmable shifter 180 allows the digital filter time constant $\tau$ to be varied under exacting conditions unlike an analog filter whose time constant is difficult to vary in a precise and well controlled manner. Since time constant $\tau$ is given by $T_p/\log \alpha$ and since $\alpha$ is given by $1/(1-2^{-S})$, the time constant may be re-written as:

$$\tau = -\frac{T_p}{\ln(1-2^{-S})} \quad (4)$$

An examination of Equation (4) shows that $\tau$ equals zero for S equal to zero and increases monotonically with increasing S. Thus, by varying the shift value S, $\tau$ may be varied. The ability to control the value of $\tau$ is very important in achieving lockon: during the preamble, when the value of the bit-center transition is unknown, $\tau$ is forced to zero at the start of the preamble by setting the shift value S to zero. With a $\tau$ equal to zero, the digital filter 100 reacts instantaneously to the input value of the bit-center transistion and lock is immediately achieved. At the same time, the digital filter 100 is incapable of filtering out jitter because $\tau$ is 0. When $\tau$ is then gradually increased by increasing the shift value S until the end of the preamble, at which time $\tau$ attains the normal value and the digital filter 100 strongly filters out jitter. Thus the digital filter 100, having a variable time constant control, allows the present invention to achieve rapid lockon and also enables the gradual filtering of phase jitter without destabilizing the clock and data recovery circuit.

Referring again to FIG. 3, the output 140 from the digital filter 100 is coupled to the shifter 118 of the waveform synthesizer 86. The output of the digital filter is a binary word whose value is the average location of the bit-center transition with respect to the reference clock $T_p$. This value is input as the control to the shifter 118 in the waveform synthesizer 86. The shifter 118 shifts the pattern input to it from the pattern generator by the amount given by the digital filter output 140. Several examples of how the shifted pattern appears as a function of the bit-center location are given in FIG. 11. The pattern generator 116 also outputs a pattern of all 1's during the time the preamble is received. With this pattern, no transitions in the digitized phase-encoded data are masked out so that the lockon may be achieved. At the end of the preamble the pattern given in FIG. 11 corresponds to the output 126 and bit-boundary transitions—not bit-center transitions—are masked out. The output of the shifter 118 is used both to mask out the digitized transitions from the transition detector 88 and to synthesize the recovered clock signal 110. Synthesis is accomplished with the DTC 120 whose operation is described in detail in the pending patent application Ser. No. 07/444,670, filed Dec. 1, 1989, and entitled "METHOD AND APPARATUS FOR SYNTHESIZING DIGITAL WAVEFORMS." The DTC 120 receives precise timing pulses from the SDL 82. The output from the DTC 120 is buffered by buffer 142 in producing the recovered clock signal 110. The recover signal 110 is also used to sample the phase-encoded data with a D-type flip-flop 102 to generate the recovered data signal 108.

In order to cancel out the delaying effects or skew of the DTC 120 and of the output buffer on the recovered clock signal 110, the phase-encoded data 104 is delayed by a delaying stage 112—usually a chain of inverters—before it is input into the D-type flip-flop 102. As such, the skew between the phase-encoded data 104 and the recovered clock signal 110 is cancelled out and the data is sampled precisely at ¾ bit-time as is desired in the clock and data recovery of Manchester phase-encoded data. The delay stage is intended to track variations in the delay caused by the DTC 100 and the output buffer 142 to the recovered clock signal 110. Therefore, the delay is intentionally allowed to be affected strongly by variations in processing temperatures and voltage just as are the delays of the DTC 120 and the output buffer 142.

While the present invention has been particularly described with reference to FIGS. 1–11 and with emphasis on integrated circuits, it should be understood that the figures are for illustration only and should not be taken as limitations on the invention. In addition, it is clear that the method and apparatus of the present invention have utility in many applications where recovery of clock and data information in a data communication system is required. It is contemplated that many changes and modifications may be made by one of ordinary skill in the art without departing from the spirit and scope of the invention as disclosed.

I claim:

1. An integrated circuit having a reference clock with period $T_p$ for detecting and recovering signals from a transmission line coupled to at least one transmitting station having a clock period $T_t$, including a D-type flip-flop and a synchronous delay line (SDL) coupled to a waveform digitizer and to a waveform synthesizer, said SDL providing timing pulses to said waveform digitizer and to said waveform synthesizer, said waveform digitizer receiving said signals for converting said signals into a digitized signal, said signal being encoded with clock and data information in a single stream of pulses, said stream of pulses having bit-center transitions and bit boundary transitions, said D-type flip-flop outputting said data information of said signals, said integrated circuit comprising:

a transition detecting means coupled to said waveform digitizer for extracting the location of transitions of said signals received by said waveform digitizer;

a masking means coupled to said transition detecting means and said waveform synthesizer for isolating said bit-center transitions from said signals; said waveform synthesizer providing mask bits to said masking means for masking out bit-boundary transitions;

at least two encoding means coupled to said masking means for encoding the locations of bit-center transitions of said signal, said encoding means being further coupled to an adding means and an L-type register means for averaging the locations of the bit-center transitions of said signals;

Means for generating a variable input signal;

a filtering means coupled to said L-type register for locking on said digitized signal and for filtering out jitter from said signals, said filtering means further said receiving a variable time input, said filtering means being further coupled to said waveform synthesizer for synthesizing said clock information for said integrated circuit; and a delaying means coupled to said D-type flip-flop, wherein said D-type flip-flop is used for delaying said data information of said signals for synchronizing the clock information from said waveform synthesizer with said data information of said signals.

2. The integrated circuit as defined in claim 1, wherein said $T_t$ and said $T_p$ are matched to a predetermined tolerance.

3. The integrated circuit as defined in claim 1, wherein said $T_t$ and said $T_p$ have a random phase relationship.

4. The integrated circuit as defined in claim 1, wherein said binary word from said waveform digitizer is digitized at intervals of $T_p/N$, said N corresponding to the resolution of said waveform digitizer.

5. The integrated circuit as defined in claim 1, wherein said transition detecting means comprises N XOR gates coupled to a D-type flip-flop said N corresponding to the resolution of said waveform digitizer.

6. The integrated circuit as defined in claim 1, wherein said masking means comprises N AND gates, said AND gates receiving as input said binary word from said waveform digitizer and said mask bits from said waveform synthesizer said N corresponding to the resolution of said waveform digitizer.

7. The integrated circuit as defined in claim 1, wherein said encoders are further coupled to said L-type register through an AND gate for freezing said L-type register upon absence of a bit-center transition as a result of phase jitter.

8. The integrated circuit as defined in claim 1, wherein said filtering means comprises a first subtractor coupled to a programmable shifter, said programmable shifter being further coupled to a second subtractor, said second subtractor being coupled to a D-type register, said D-type register being further coupled to a rounding logic unit.

9. The filtering means as defined in claim 8, wherein said programmable shifter is coupled to receive a control signal, said control signal permitting the time constant of said filtering means to be varied by a predetermined amount.

10. The filtering means as defined in claim 9, wherein said time constant is related to $T_p$ by $-1/\ln(1-2^{-S})$, said S being equivalent to said predetermined amount.

11. The integrated circuit as defined in claim 1, wherein said delaying means comprises a plurality of inverters.

12. The integrated circuit as defined in claim 1, wherein said D-type flip-flop regenerates said data information, said D-type flip-flop being coupled to said waveform synthesizer through a buffer for receiving said clock information of said signals.

* * * * *

UNITED STATES PATENT AND TRADEMARK OFFICE
CERTIFICATE OF CORRECTION

PATENT NO. : 5,103,466
DATED : April 7, 1992
INVENTOR(S) : Mel Bazes

It is certified that error appears in the above-indentified patent and that said Letters Patent is hereby corrected as shown below:

Col. 14, Line 16    After the word "flip-flop" Delete","

Col. 14, Line 17    Delete "wherein said D-type flip-flop is used"

Col. 14, Line 18    After the word "signals" Insert --wherein said D-type flip-flop is used--

Signed and Sealed this

Twenty-sixth Day of April, 1994

Attest:

BRUCE LEHMAN

Attesting Officer    Commissioner of Patents and Trademarks